(12) United States Patent
Gumpel et al.

(10) Patent No.: US 7,836,508 B2
(45) Date of Patent: Nov. 16, 2010

(54) DATA MASKING APPLICATION

(75) Inventors: Damian Gumpel, Missouri City, TX (US); Rishikesh Dinanath Chaughule, Mumbai (IN)

(73) Assignee: Accenture Global Services Limited, Dublin (IE)

( * ) Notice: Subject to any disclaimer, the term of this patent is extended or adjusted under 35 U.S.C. 154(b) by 1319 days.

(21) Appl. No.: 11/273,449

(22) Filed: Nov. 14, 2005

(65) Prior Publication Data

US 2007/0110224 A1    May 17, 2007

(51) Int. Cl.
    G06F 21/00    (2006.01)
(52) U.S. Cl. .......................................... 726/26; 380/252
(58) Field of Classification Search ................. 380/28; 726/26
    See application file for complete search history.

(56) References Cited

OTHER PUBLICATIONS

Selected webpages available at website http://www.plato.qroup.com regarding Camouflage software made available by Plato Group as of Aug. 12, 2005, fifteen pages.*
Selected webpages available at website http://www.platogroup.com regarding Camouflage software made available by Plato Group as of Aug. 12, 2005, fifteen pages.
Selected webpages available at website http://web.archive.org that are represented by web.archive.org to be webpages of Plato Group that were publicly available as of Jun. 2, 2004 and regard Camouflage software, two pages.
Selected webpages available at website http://web.archive.org that are represented by web.archive.org to be webpages of Plato Group that were publicly available as of Oct. 9, 2004 and regard Camouflage software, five pages.
Selected webpages available at website http://web.archive.org that are represented by web.archive.org to be webpages of Plato Group that were publicly available as of Dec. 14, 2004 and regard Camouflage software, five pages.
Selected webpages available at website http://web.archive.org that are represented by web.archive.org to be webpages and information of Plato Group that were publicly available as of Jan. 20, 2005 and regard Camouflage software, twenty two pages.

* cited by examiner

*Primary Examiner*—Gilberto Barron, Jr.
*Assistant Examiner*—Devin Almeida
(74) *Attorney, Agent, or Firm*—Brinks Hofer Gilson & Lione

(57) ABSTRACT

A process for masking data that includes providing a field of data to a masking application system and replacing the field of data with identical masked data regardless of a type of application that supplies the field of data to the masking application system. The process further including forming a meta data file that has information pertaining to a format of a piece of data and a format of the masked data as output from the masking application system.

31 Claims, 9 Drawing Sheets

MetaDAta.wml

```
<datafile-name>inputfile.txt</datafilename>
<contact-email>jhill@chase.com</contact-
email>
<user>jhill</user>

<input-format>
   <input-field>
       <field-name>LNAME</field-name
       <field-start>16</field-start>
       <field-end>25</field-end>
       <field-mask>Y</field-mask>
   </input-field>
</input-format>

<output-format>
   <separator>4</separator>
   <output-field>
       <field-hame>LNAME</field-name>
       <field-sequence>0</field-sequence>
       <field-start>16</field-start>
       <field-end>25</field-end>
       <field-case>T</field-case>
       <field-delimiter></field-delimiter>
   </output-field>
</output-format>
```

Data Masking Application

- Home
- Create User
- Reverse Lookup List
- My Profile
- Change Password
- Logout

Reverse LookUp

*Field Type : [FNAME ▼] 280

*Masked Value : [ABRAM] 282

[Submit] [Clear]

Data Masking Application

Total rows for 'ABRAM' : 1

Reverse LookUp

- Home
- Create User
- Reverse Lookup List
- My Profile
- Change Password
- Logout

*Field Type : FNAME ∨  [Submit]
*Masked Value : ABRAM  [Clear]

| Masked FNAME | Original FNAME |
|---|---|
| ABRAM | ANDRE |

Masked First name → ABRAM
Unmasked First name → ANDRE

Fig. 6B

Data Masking Application

- Home
- Create User
- Reverse Lookup List
- My Profile
- Change Password
- Logout Total rows for 'ANACKER' : 1

Reverse LookUp

*Field Type   :   LNAME  ⌄   — 280

*Masked Value :   ANACKER       — 282

[Submit] [Clear]   — 284

| Masked LNAME | Original LNAME |
|---|---|
| ANACKER | BURLETTE |

— 278

*Masked Last name* ← ANACKER

*Unmasked Last name* ← BURLETTE

Done — Local Intranet

DATA MASKING APPLICATION

BACKGROUND OF THE INVENTION

1. Field of the Invention

The present invention relates to devices and processes that protect the proprietary nature of certain data of a party while being used by a third party.

2. Discussion of Related Art

It is a well known practice in today's business climate to have a business hire an outside development firm to develop hardware and software applications to be sold to the business and designed to process data of the business to reduce labor costs and get more value out of their IT (Information Technology) budgets. However, before the hardware and software application are released to the business for every day use, it is necessary to test the hardware and software. In the past, businesses have provided the development firm with copies of real production data to develop and test the hardware and software. Naturally, this allows the development firm to view information that is proprietary to the business. This leaves the business vulnerable to theft or improper use of the proprietary information by the development firm, an employee of the development firm or a third party who obtains the information directly or indirectly from the development firm, One solution to the above problem is to use a testbed that contains fictional data during the testing of the hardware and the software application by the development firm or an outside testing firm. However, this requires that the testbed be constantly maintained by a team and updated every time the hardware and software application is retested or updated (for example, data model changes). Also, this same process would need to be applied to all other hardware and software applications that undergo retesting and updating by the development firm or an outside testing firm. Accordingly, there is a great deal of redundant work that needs to be done and the benefit of developing hardware and software applications by development firms can be easily offset by the overhead of maintaining these testbeds with fictional data.

Another possible solution to the problem is to develop a custom process to mask each business application's sensitive data. This would involve developing and maintaining separate processes for each of the applications that contain sensitive data. This approach is not feasible in business environments where there is integration between applications. As a result, testing groups within a business that need to test the integration of customer data between multiple systems, but the data is masked differently in each system, will not be able to perform an adequate level of end-to-end testing of business processes.

Another possible solution to the problem is to purchase, customize, and maintain a third party packaged tool that performs data masking. Examples of third party tools that performs data masking are: Relational Tools made by Princeton Softech of Princeton, N.J., TestBase made by Macro 4/SoftBase of Asheville, N.C. and File-Aid made by CompuWare of Detroit, Mich. However, these tools either work only for certain database vendors (such as IBM, DB2, IMS or Oracle), database types (such as QSAM or VSAM) or server platforms (such as a mainframe). The masking process that these tools use vary, but overall limit the ability to perform effective data masking. The above-mentioned tools must be installed on the same platform as the datastore of the business application. Since most of these tools were originally developed for use on mainframe applications, they are either limited to supporting mainframe-based business applications or they have been adapted for use on limited types of other platforms, but not providing a complete set of data masking functionality. Such is the case with the previously mentioned File-Aid tools made by CompuWare. Its version that supports the Oracle relational database does not have the full set of functionality that the original mainframe-based version has.

Another disadvantage of third party tools, such as Princeton Softech's Relational Tools, is that they require human intervention to create and store new relationships between original data and masked data and so can increase overhead costs.

One masking process that is offered is to scramble a value. This means that within a field, the position bytes of the characters or numeric values can be rearranged (e.g. 123456→153426 or ABCDE→ABEDC). The drawback is that the characters of the original value are still present and can be unscrambled with relative ease by an individual.

A second masking process used by third party tools is to replace the original value with a randomly generated value. The drawback to this is that each time the same original value is masked, the resulting masked value will be different, preventing testing groups from having consistently masked data to test.

A third masking process used by third party tools is to translate the original value with a predefined value from a reference table called the Two Column Translate Table. This table needs to be predefined. Some tools provide this masking process, but not for all platforms, database types, or vendors.

SUMMARY OF THE INVENTION

One aspect of the present invention regards a data masking system that includes a file transferring device for uploading and downloading files and a directory operatively connected to the file transferring device and having an input data file containing a field of data to be masked. A masking application system that receives the input data file from the directory and masks the field of data in the form of an output data file, wherein the masking application system has a structure that masks any type of text based data regardless of the platform, database type or vendor that generates the any type of text based data. The directory further includes a meta data file having information pertaining to a format of the input data file and a format of the output data file.

A second aspect of the present invention regards a process for masking data that includes providing a field of data to a masking application system and replacing the field of data with identical masked data regardless of a type of application that supplies the field of data to the masking application system. The process further including forming a meta data file that has information pertaining to a format of a piece of data and a format of the masked data as output from the masking application system.

A third aspect of the present invention regards a process for masking data that includes providing a field of data to a masking application system and replacing the field of data with masked data, wherein the case of the masked data is controlled. The process further involves forming a meta data file that has information pertaining to the case of the masked data and controlling the case of the masked data with the meta data file.

A fourth aspect of the present invention regards a process for masking data that includes providing a field of data to a masking application system and replacing the field of data with masked data in a consistent manner so that each time the field of data is replaced with masked data, the masked data is always the same. The process further includes forming a meta data file that has information pertaining to a format of a piece of data and a format of the masked data.

A fifth aspect of the present invention regards a process for masking data that includes providing a field of data to a masking application system and replacing the field of data with masked data, wherein masked data is always available for use during the replacing process. The process further includes providing a reference table containing masked values for the field of data and providing a lookup table containing a list of possible masked values for the field of data and existing relationships between unmasked data in the filed of data and masked values from the reference table.

A sixth aspect of the present invention regards a process for masking data that includes providing a field of data to a masking application system, wherein the field of data has n elements and an element is a member of a set of parameters that has m possible values. The process further includes replacing the field of data with masked data in accordance with a cipher, wherein the cipher includes a n×m matrix of random masked values and the replacing includes replacing an ith element of the field of data having a value of j with a masked value in the matrix that is located at the ith row and the jth column.

One or more aspects of the present invention provides the advantage of being used for multiple hardware and software applications.

One or more aspects of the present invention provides the advantage of allowing development firm and third parties to test and implement hardware and software application for a business client without being exposed to proprietary information of the business client.

One or more aspects of the present invention provides the advantage of allowing a business client to use development firms and third parties to develop hardware and software applications for the business that result in cost and labor savings for the business client.

One or more aspects of the present invention provides the advantage of providing masked data that is easy to understand.

One or more aspects of the present invention provides the advantage of masking data in a consistent manner so that the development and testing versions of an application will be consistently masked. This is critical for applications that need to integrate data. There is no value to mask "Bill Gates" one way in one application and another way in another application if you then need to test interfaces between these two applications.

One or more aspects of the present invention provides the advantage of automatically creating and storing relationships between original data and masked data.

One or more aspects of the present invention provides the advantage of preserving case sensitivity (i.e., UPPER, lower, or Proper Case) from going to the original data to masked data and vice versa.

One or more aspects of the present invention provide a user with the ability to accept any input file layout and so use the present invention with different information systems.

BRIEF DESCRIPTION OF THE DRAWINGS

FIG. 2 shows an embodiment of a meta data file to be used with the data masking system of FIG. 1;

FIGS. 6A-B show various stages of usage of a reverse lookup screen to be used with the data masking system of FIG. 1; and FIGS. 7A-B show various other usages of the reverse lookup screen of FIGS. 6A-B.

DETAILED DESCRIPTION OF THE DRAWINGS AND THE PRESENTLY PREFERRED EMBODIMENTS

Figure 1:
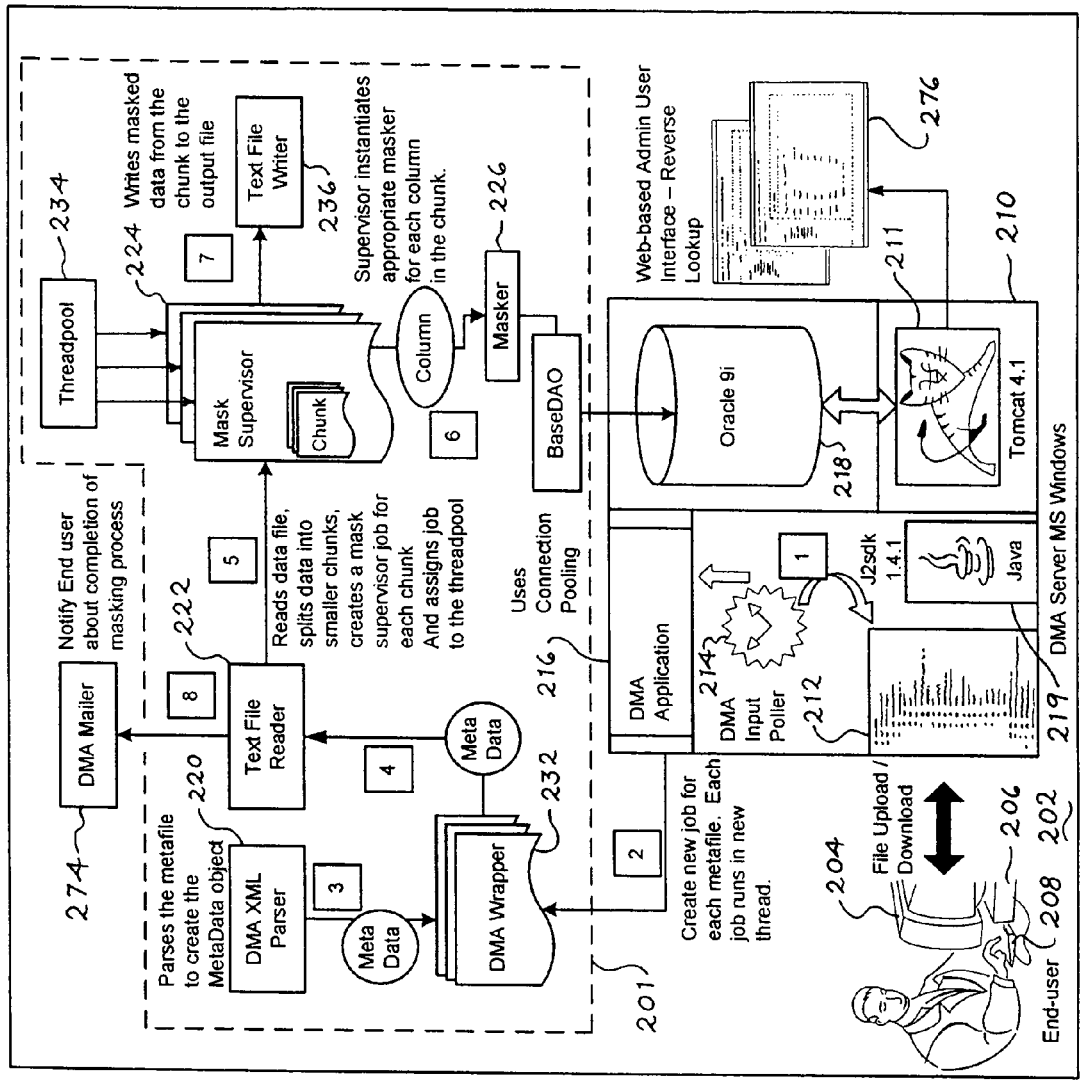
FIG. 1 schematically shows an embodiment of a data masking system in accordance with the present invention.

As schematically shown in FIG. 1, an embodiment of a data masking system 200 includes a file transferring device for uploading and downloading files. An example of a file transferring device is a personal computer 202 or a laptop computer, both having a visual display 204, a processor 206 and a data/file input, such as a keyboard 208, a mouse, or a touch screen. The personal computer 202 is operationally connected to a data mask application server 210. The electrical connection can be via a hard wire connection or via the Internet. The server 210 can be an MS Windows compatible server.

As shown in FIG. 1, the server 210 includes a user directory 212 and a data input polling mechanism 214 that is operatively connected to the user directory 212 and a data masking application 216. The server 210 also includes a relational database 218 that serves as a memory for the masking application. The operation of the server 210 and its various components will be explained later in conjunction with the explanation of the overall masking process.

The server 210 represents one physical or logical grouping of physical servers whereupon the software components of the data masking application will reside. These components include file directory structure 212, DMA poller 214, data masking application 216, Oracle relational database 218, Tomcat web server 211, and J2SDK 219. The data masking application 216 is based on the Java programming language and will utilize the J2SDK 219 as the run-time engine. J2SDK is well known in the art as the Java 2 Software Development Kit, which contains the development environment developed by Sun Microsystems to create and run Java applications. As of the time of the present application, J2SDK is available at not cost from Sun Microsystems. The components included within masking application system 201 show a more granular representation of the data masking application 216. The masking application system 201 includes a data masking application parser 220 which in turn is operatively connected to a text file reader 222. The text file reader 222 is operatively connected to a mask supervisor 224. The mask supervisor 224 is operatively connected to the database 218 of the server 210 via a masker 226.

In operation, the data masking system 200 is setup as a one time activity as part of the installation and configuration of the data masking application 216. During the setup process, an administrator runs SQLLoader scripts to upload reference data entered via personal computer 202 into reference tables present in the database 218. Note that SQLLoader is well known to be a utility provided by Oracle to upload data to database table from flat files. Of course other uploading software can be used as well. Besides uploading reference data, the administrator schedules the input polling mechanism 214 at periodic intervals, via Windows Scheduler, to launch the data masking application 216 periodically. The administrator also creates user IDs for application users so that only authorized users can access the data masking application 216.

The administrator also creates the user directories 212 on the server 210, wherein users at personal computer 202 will upload both meta files and data files. The administrator then grants access to the users to their respective user directories 212.

For the purpose of the discussion to follow, a data file contains the data that will be masked by the data masking system 200. An example of a meta file is shown in FIG. 2. The meta file 228 is an XML (Extensible Markup language) file that contains information pertaining to the format of the input data file and the expected output file. In general, the meta file 228 has the name of the data file which is to be masked and the email id to which a notification is to be sent after the completion of the masking process. The meta file 228 also gives information whether a particular field is to be masked, the separator used to separate the fields in the output file and the case of output data (e.g. UPPER CASE, lower case, etc).

Since the data file is a flat, text-based file and the meta data file is an XML based file, any business application, regardless of platform, database type, or vendor, that can create a text based output of its data, can have the data masked by the data masking system 200. The use of such separate files also provides a user the ability to accept any input file layout and so use the files with different information systems. As each business system may store a common set of sensitive data elements in different relational structures, the system 200 has the flexibility to accept input files with different subsets of data elements to mask as well as different physical layouts of such data elements on the input file.

After the data masking system 200 is setup and the data masking application 216 is installed and configured, the user at the personal computer 202 uploads a meta file and a data file (using File Transfer Protocol or any other mechanism) to that user's particular directory in the user directories 212 on the server 210. For example, a user 'jHill' uploads the meta file in the directory ..\DMADATA\input\jhill\metafile and the data file in the directory ..\DMADATA\input\jhill\datafile.

Note that throughout the present application, a thread pool is a mechanism that is commonly used to optimize the performance of an application. A thread is a process in a multithreading environment whereby two or more parts of a program can run simultaneously. This allows multiple files to be processed simultaneously. Thread pools manage all the threads of a particular program in terms of how much system resources, like memory, are needed by each thread. In addition, as used above and throughout this application, a masking supervisor is a reusable process that will direct the masking process. Many instances of the masking supervisor may be running at the same time, but each one will be dedicated to a separate thread.

Figure 3:
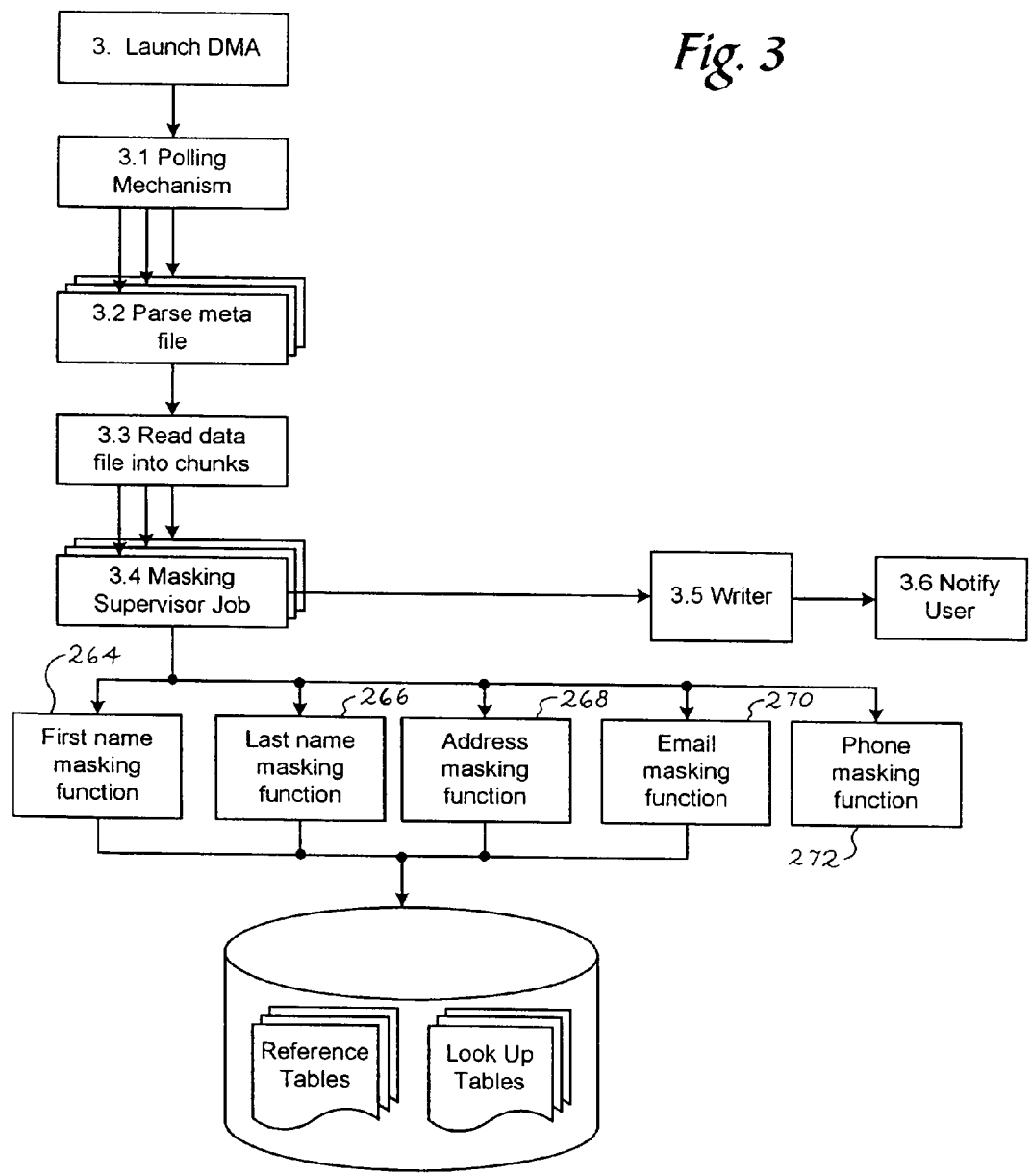
FIG. 3 shows a flow chart of a possible masking process to be used with the data masking system of FIG. 1.

Once the meta file and data file are uploaded, the data masking process can be implemented. A possible data masking process is shown in FIG. 3 for the case when corresponding first names, last names, addresses, email addresses and phone numbers in the uploaded data file are to be masked. As shown in FIG. 3, the data masking application 216 on the server 210 is launched per step 3 at preset regular intervals as set by the previously mentioned setup process. Such periodic launching is done so that the user only needs to copy the meta file and data files to the respective user directories 212 for the masking process to begin.

At the time of launch of the data masking application 216, the data input polling mechanism 214 searches for uploaded meta files and corresponding uploaded data files on the user directory 212 per step 3.1 shown in FIG. 3. The Meta Data Object 230 is loaded into the memory of the computer when a masking process starts and is used throughout the masking process to understand the format of the input file. For each meta file found, the polling mechanism 214 creates a new DMA Wrapper 232 thread to process the found meta file, wherein a thread is a process in a multithreading environment whereby two or more parts of a program can run simultaneously. This allows multiple files to be processed simultaneously. Note that the polling mechanism 214 preferably is a code written in Java language.

As mentioned previously, the meta file contains information pertaining to the format of the input data file and the expected output file. In order to extract the format information, the data masking application parser 220 operates on the meta file so as to parse out the information in a manner similar to that shown in FIG. 4. In particular, the parser 220 preferably is a code written in a Java Language that makes use of Document Object Model (DOM), a hierarchical representation of an XML document. DOM is a programming interface that allows HTML pages and XML documents to be created and modified as if they were program objects. DOM makes the elements of these documents available to a program as data structures, and supplies methods that may be invoked to perform common operations upon the document's structure and data. DOM is both platform- and language-neutral and is a standard of the World Wide Web Consortium.

Figure 4:
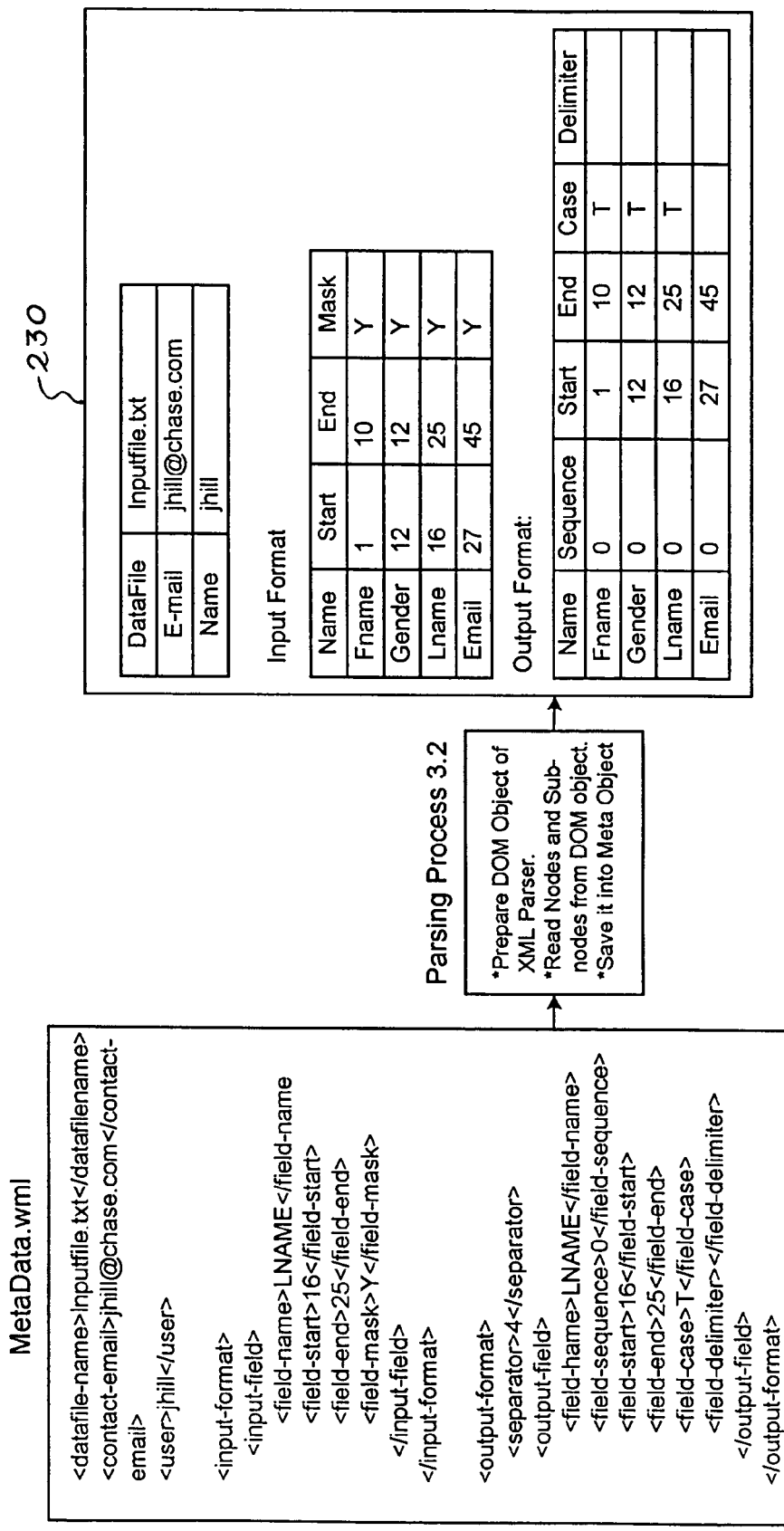
FIG. 4 shows an example of a parsing process to be used with the masking process of FIG. 3 and the data masking system of FIG. 1.

The parser 220 operates on the meta file and prepares a corresponding DOM Object. The parser 220 then reads the nodes and subnodes of the DOM Object and forms and saves a Java object which will be referred to as a Meta Data Object. As shown in FIG. 4, the Meta Data Object 230 stores the format information (e.g. it has the name of the data file which is to be masked, the input data file format and the output file format) contained in the meta data file. The Meta Data Object 230 is loaded into the memory of the computer when a masking process starts and is used throughout the masking process to understand the format of the input file.

At this stage of the masking process, the data file corresponding to the meta data file that has been parsed per step 3.2. As explained previously, the DMA Wrapper 232 processes the found meta file. Next, the DMA Wrapper 232 passes the Meta Data Object 230 to the text file reader 222 shown in FIG. 1 per step 3.3 of FIG. 3. The reader 222 reads the data file based on the Meta Data Object 230 since the Meta Data Object contains information regarding the format of the input data. For example, suppose that the meta data file contains the following instructions:

```
<input-field>
    <field-name>LNAME</field-name>
    <field-start>16</field-start>
    <field-end>30</field-end>
    <field-mask>Y</field-mask>
</input-field>
```

The meta data object 230 would store the information that LNAME is to be read from between locations 16 and 30 in the data file and so the reader would read the last name from between locations 16 and 30 in the input data file. Note that the reader 222 reads a predetermined number of rows from the data file at one time and stores them in an entity called a "chunk," which is a Java object that contains data from a set of lines read from the data file. Thus, the entire data file is split into a number of chunk objects. The reader 222 starts up a dedicated instance of the masking supervisor specifically for the chunk, assigns masking supervisor job to the thread pool 234. Note that the masking supervisor job preferably is a code written in a Java language.

At the next step 3.4 of the process per FIG. 3, the chunks formed by the reader 222 are masked, where appropriate, by the mask supervisor 224 while the reader 222 continues to read the next set of rows from the data file into a new chunk. Note that each masking supervisor job is processed by a separate thread which is a member of the thread pool 234. The thread pool 234 is a group of threads created when the application starts. The thread pool 234 restricts the number of threads that can be created. Each thread is assigned a mask supervisor job. Once the job is finished, the thread gets assigned to the next job. The threads run in parallel and hence multiple mask supervisor jobs are executed in parallel. The number of threads in the pool determines the number of mask supervisor jobs that can be processed simultaneously.

In operation, the mask supervisor 224 checks a flag associated with each type of data in the data file to determine if masking is required for the data in question. For each type of data in the data file, the corresponding masking supervisor job checks the flag indicating whether masking is required (This flag derives its value from the <field-mask> tag in the meta file). The letter 'Y' in this tag denotes that the field is to be masked and the letter 'N' denotes that it need not be masked. These same tag letters are used in the meta data object as shown by the input format of the meta data object 230 of FIG. 4. Thus, the mask supervisor 224 is able to process through, but not mask, certain data elements the user does not wish to mask, but yet are required to uniquely identify other data elements on the same file record that will be masked by the system 200.

One example of data elements not to be masked are the row id data elements, which uniquely identifies a record on a table of a relational database. Such data elements will need to be provided in the output file along with the masked data elements so that the corresponding record in the source business information system can be located and updated with the new masked values.

If the flag has a "Y" value indicating that masking is to be performed, the mask supervisor 224 applies an appropriate masking function at masker 226 to the data to mask the data. The masking functions 264, 266, 268, 270, 272 perform a specific masking process and is specific to the particular data type, such as first name, last name, address, email address and phone number, that is to be masked. The masking function provides the masked data and the masking supervisor overwrites the original data with the masked data in the chunk.

For data elements that are numeric in nature, the corresponding masking function performs a calculation to derive a new number that has the same length as the original data element. For example, for a data field that regards phone numbers, the corresponding PHONE masking function masks the actual phone number with another number of the same size using a key. So, the phone number 1-559-5005081 may be replaced as 1-559-3690862. Preferably, the numeric numbers are masked via a cipher that translates each digit in a number to a masked value based on the position of the digit. In this case, the number of digits for the numeric number to be masked is determined and a cipher corresponding that that number is then utilized to mask the numeric number.

A cipher is an algorithm for performing encryption and decryption—a series of well defined steps that can be followed as a procedure. To encrypt a 5 digit number, we require a cipher of size 5 by 10, wherein 5 is the number of elements/digits that define the number and 10 is the number of possible values for each element/digit which is a member of the set of base ten parameters. A sample cipher is shown below. Each digit in any one row of the cipher is unique.

| Position | Digit to mask (a) | | | | | | | | | |
|---|---|---|---|---|---|---|---|---|---|---|
| (b) | 0 | 1 | 2 | 3 | 4 | 5 | 6 | 7 | 8 | 9 |
| 1 | 2 | 7 | 4 | 0 | 1 | 6 | 5 | 9 | 3 | 8 |
| 2 | 4 | 8 | 2 | 6 | 3 | 9 | 1 | 0 | 7 | 5 |
| 3 | 7 | 9 | 0 | 4 | 5 | 3 | 8 | 1 | 2 | 6 |
| 4 | 1 | 3 | 4 | 8 | 2 | 0 | 7 | 6 | 9 | 5 |
| 5 | 3 | 6 | 1 | 0 | 4 | 2 | 8 | 5 | 7 | 9 |

To encrypt a number, we consider each integer in the number and the position (starting from the left) of the integer inside the number. For example, first, the integer at the first position of the number i.e., '3' is considered. So, a=value of integer to be masked=3 and b=position of integer=1. This integer is replaced with the integer present the location [b,a] in the array i.e. [1, 3]. So '3' is replaced with '0'. The same process is repeated for subsequent integers in the number. Therefore, 35918 is masked as 09637. Note that in the case of five letter words, a corresponding cipher is implemented by employing a corresponding 5×26 matrix (5=number of letters in each word and 26=number of possible letters that can be used with each letter of a word) and then masking the word in a manner similar to that described above with respect to the encryption of a number.

In order to decrypt the number, we consider each integer in the encrypted number and the position (from left) of the integer inside the encrypted number. For example, to decrypt 09637, first, the integer at the first position i.e., '0' is considered. For the integer in the first position, row 1 of the cipher is scanned for the presence of the integer. '0' is found in the column 3 in row 1. Hence '0' is replaced with '3' in the decrypted number. This process continues for the subsequent integers in the encrypted number. For each subsequent integer, the corresponding row is scanned for the presence of the encrypted integer and the column number in which the encrypted integer is found, that column number is the decrypted value. Therefore, 09637 is unmasked as 35918. A word, such as the five letter word mentioned above, would be decrypted in a similar manner.

Note that other numeric data can be masked as well, such as credit card numbers and Social Security Numbers. For each numeric data, a customized masking mechanism can be used. This flexibility in customizing masking functions allows a business to address specific masking needs. For example, credit card numbers and Social Security Numbers are both data elements that a business would want to mask prior to exposing the data to a development or third party firm. While these two data elements are numeric in nature, a different masking approach may need to be taken to mask each one. The above described masking application may utilize a 20 by 10 cipher in order to be able to mask a number with a maximum of 20 digits.

For elements like names and email, a corresponding masking function performs a translation using lookup and reference tables stored in database 218 and used by masker 226. Note that the database 218 contains a pair of lookup and reference tables for each masking function that masks business data by associating it to masked values stored in reference tables. Each reference table contains lists of possible masked values. For example, the last name reference table can contain possible last names that can be used as masked values.

The last name lookup table can contain existing relationships between unmasked last names and masked values from the last name reference table. The particular masking function for last names looks on the last name lookup table to see if an association has previously been established between a last name and a masked value (i.e. if the last name 'Smith' has been masked by the present application). If so, it will retrieve the associated masked value from the reference table.

If an association is not found, then the masking function creates an association to an unused reference value. This association will be used for all future masking of the unmasked last name. Thus, the data masking system 200 will always mask data to the same masked value. Furthermore, the system 200 automatically creates a new relationship between original data and the masked data, if no relationship previously existed for the original data. This would be the case if, for example, a specific last name has not yet been masked. The association process will determine that the original value has not been masked in the past and will thus retrieve an unassociated masked value and associate it to the specific original value so that future maskings of the specific original value will results in the newly associated masked value. The masking supervisor job then sends the masked chunk to the text file writer 236 per step 3.5 of FIG. 3 to write the rows of data to the output file.

Figure 5:
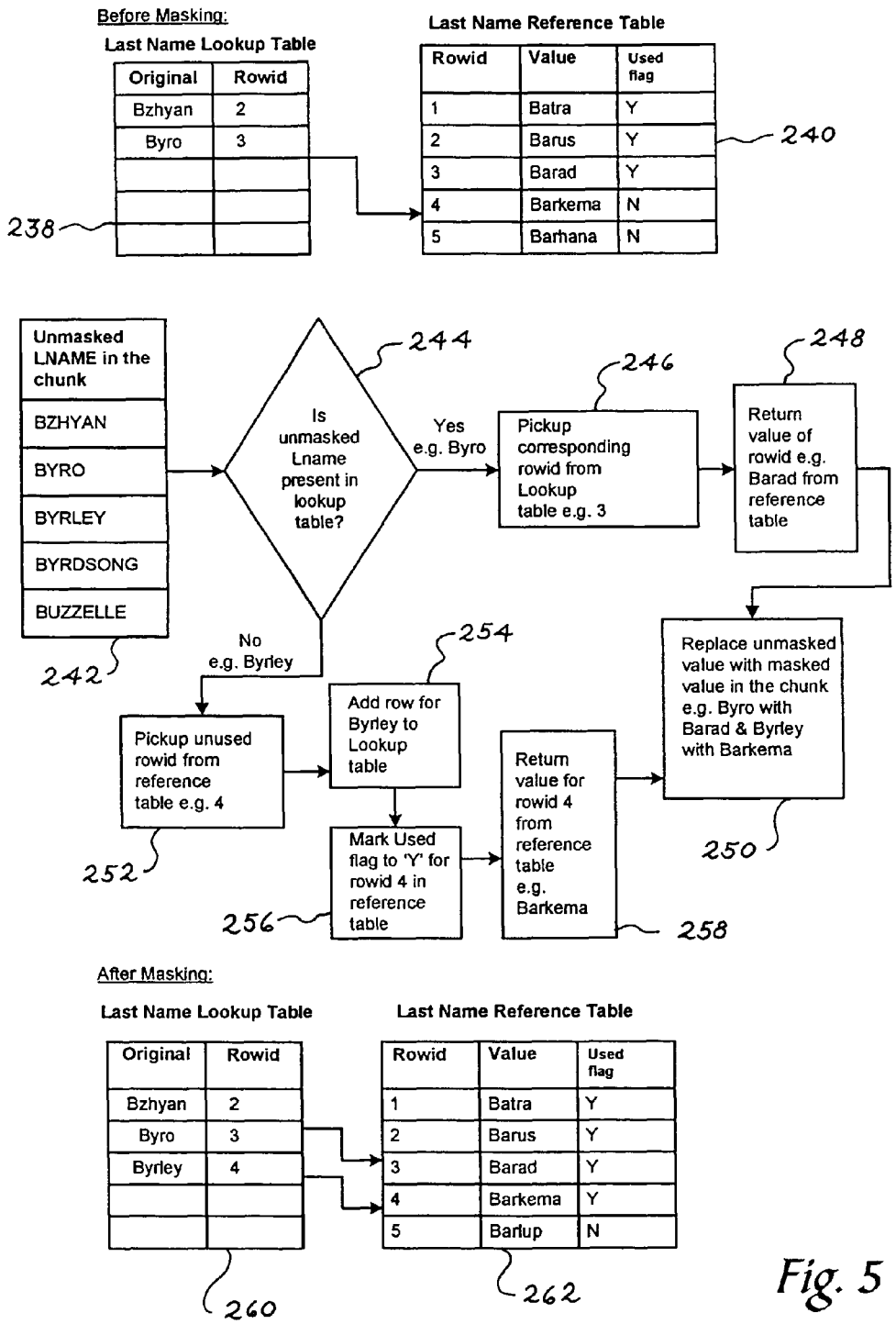
FIG. 5 shows an example of a masking process to be used with the masking process of FIG. 3 and the data masking system of FIG. 1.

A more detailed explanation of a possible way of masking alphabetic data, such as last names, is shown in FIG. 5. In this process, a last name lookup table 238 and a last name reference table 240 are stored in the database 218 The chunk of data sent by reader 222 is represented by box 242. At this point, the masker 226 determines, per step 244, if the unmasked names in the chunk 242 are present in the lookup table 238 which reflects which last names have been previously associated with a mask name. In the case of the last name "Byro" in the chunk 242, Byro is present in the lookup table 238. Per step 246, the corresponding rowid for "Byro" is determined to be "3" which identifies the rowid in the last name reference table of the masked name that has been previously established for "Byro." In this case, masked name of "Barad" is identified with rowid 3 of the last name reference table 240 per step 248 and the last name "Byro" is replaced by the masked name "Barad" per step 250.

In the case of the last name "Byrley" in the chunk 242, Byrley is not present in the lookup table 238. Per step 252, the first available rowid is chosen from the reference table 240 that is unused as designated by "N" in the table and denotes a mask name that has not previously been affiliated with a name. In our example, the mask name of rowid 4 is unused and so the corresponding mask name "Barkema" is associated with Byrley. This association is reflected in the lookup table 238 by adding Byrley to the lookup table 238 along with the rowid 4 per step 254. Furthermore, the flag for rowid 4 of the reference table 240 is changed from "N" to "Y" per step 256. Following step 256, the masked value for that record is retrieved and passed on to step 250 to replace the unmasked value "Byrley" with the masked name "Barkema" per step 258. Next, the last name Byrley is replaced by the mask name Barkema per step 250.

The lookup table 260 and the reference table 262 after the above masking processes for the last names Byro and Byrley are shown. The reference table 262 is a database table that stores all possible masked values that can be used. Note that there is one reference table for each type of data element that can be masked using a lookup masking function. The above process is continued until all last names in a chunk are processed. The process is repeated for the next chunk that arrives.

In the case of addresses, the address reference table contains fictitious addresses (combinations of street numbers and names) that can be associated to the unmasked address. The address reference table is configured similar to the last name reference table 240 shown in FIG. 5 in that it contains a "Rowid" column and a "Used flag" column. The address reference table differs from table 240 in that the "Value" column is replaced by several address-related columns. The Address table contains columns for Line1, Line2, City, State, Country, and Zip Code. The possible masked values represent actual city, state, zip, and country combinations (i.e. New York City, N.Y. 10028 as opposed to California, Ariz. 90001). The masking of addresses and other multi-value items is similar to the process shown in FIG. 5, wherein the values of the multiple columns that share the same Rowid are coupled together.

Note that in each of the examples given above, the masked data in each chunk of data is operated on the TextFile writer 236 just before it writes data to output file so that the case of the masked data is in accordance with the case information present in the meta data file.

In summary, each of the masking processes described previously shares the property that original data is consistently masked to a certain specific masked value. For example, all last names processed by the invention will each be masked to specific last name value. This relationship is stored so that every time a specific last name unmasked value is processed, the system will always mask it to the same last name masked value.

If the text file writer 236 cannot find the output file, the writer 236 creates an output file by appending 'Out' to the input data file name. Based on the meta data object created during the parsing step 3.2, the writer 236 writes the data from the chunk into the output file. For example, the writer 236 can write the masked data based on the information in the meta file described on the next page:

```
<output-format>
    <separator>4</separator>
    <output-field>
        <field-name>LNAME</field-name>
        <field-sequence>0</field-sequence>
        <field-start>16</field-start>
        <field-end>25</field-end>
        <field-case>T</field-case>
        <field-delimiter></field-delimiter>
    </output-field>
</output-format>
```

So, a masked string "Albertson" would be written in the output file between the locations 16 and 25.

Once the masking of all the chunks is completed and the masked values are written to the output file per step 3.5, a message, such as via email, is sent to the user by the data masking application mailer 274 to notify him/her of the completion of the file processing and gives the user the processing statistics. For example, once the masking process is done, a detailed list of information pertaining to the Input and Output files is sent to the DMA user. The following information is provided to the user:

| Information | Description |
| --- | --- |
| Start Time | This is the time when the Reader 222 starts reading the Input File. |

-continued

| Information | Description |
|---|---|
| End Time | This is the time where the File Processing comes to an end. |
| Read Lines | It is the number of lines successfully read by the Reader 222 from the Input File. |
| Written Lines | It is the number of lines successfully written to the Output File. |
| Lines Failed to be Written | It is the number of lines which are not written to the Output File. |
| Number of lines successfully masked in a particular field type | It is the number of lines successfully masked pertaining to a single field. |
| Number of lines failed to be masked in a particular field type | It is the number of lines which are not masked pertaining to a single field. |

The above processes describe the situation wherein original data is subsequently masked. As explained previously, it may be necessary later in time to reverse the process so that a user can recapture the original data from the masked data. In this case, a user can log into the web-based user interface 276 via personal computer 202 to perform a reverse lookup. Based on a masked value or partial entry of a masked value, a user can find out the original unmasked value. For example, suppose the user has a data file containing a record as follows.

```
ANDRE    M BURLETTE    46@gmail.com      45 VIEW AVE
ALBANY         New York  United States 12209-2225  1  518500045
14555
```

Furthermore, suppose the corresponding input file portion of the meta data file is given below:

```
<input-field>
    <field-name>FNAME</field-name>
    <sub-field>
        <field-name>FIRSTNAME</field-name>
        <field-start>1</field-start>
        <field-end>12</field-end>
    </sub-field>
    <sub-field>
        <field-name>GENDER</field-name>
        <field-start>14</field-start>
        <field-end>14</field-end>
    </sub-field>
    <field-mask>Y</field-mask>
</input-field>
<input-field>
    <field-name>LNAME</field-name>
    <field-start>16</field-start>
    <field-end>30</field-end>
    <field-mask>Y</field-mask>
</input-field>
<input-field>
    <field-name>PKEY</field-name>
    <field-start>177</field-start>
    <field-end>181</field-end>
    <field-mask>N</field-mask>
</input-field>
```

As shown in the above meta data file the First Name starts at the location 1 and ends at 12 in the data file. The Last Name starts at location 16 and ends at 30. The Primary Key, which is the identification value that uniquely identifies the data record in the business application, starts at 177 and ends at 181. As indicated by the field-mask property, FNAME & LNAME will be masked whereas PKEY will not be masked.

Suppose the output file portion of the above-mentioned meta data file is as follows:

```
<output-field>
    <field-name>FNAME</field-name>
    <sub-field>
        <field-name>FIRSTNAME</field-name>
        <field-sequence>0</field-sequence>
        <field-start>1</field-start>
        <field-end>12</field-end>
    </sub-field>
    <sub-field>
        <field-name>GENDER</field-name>
        <field-sequence>0</field-sequence>
        <field-start>14</field-start>
        <field-end>14</field-end>
    </sub-field>
    <field-case>T</field-case>
    <field-delimiter></field-delimiter>
</output-field>
<output-field>
    <field-name>LNAME</field-name>
    <field-sequence>0</field-sequence>
    <field-start>16</field-start>
    <field-end>30</field-end>
    <field-case>T</field-case>
    <field-delimiter></field-delimiter>
</output-field>
<output-field>
    <field-name>PKEY</field-name>
    <field-sequence>0</field-sequence>
    <field-start>178</field-start>
    <field-end>182</field-end>
    <field-case></field-case>
    <field-delimiter></field-delimiter>
</output-field>
```

In this example, the meta data file also indicates the locations in the output file where the masked FNAME (1 to 12), LNAME (16 to 30) and PKEY (178 to 182) should be written. Furthermore, it should be noted that while the example above regarding the metafile only shows information regarding the first name, last name and primary key, the metafile can contain information for additional data types, such as address, phone number, and email address.

After the masking process is completed the output record in the above example will look like this:

Abram M Anacker 1112@abc.com 6788 297th n ave
Clearwater Fla. United States 33761-1617 1 518 369809 14555

Based on the above example, the unmasked and masked data can be summarized as follows:

| Type | Unmasked Value | Masked Value |
|---|---|---|
| First name | ANDRE | ABRAM |
| Last name | BURLETTE | ANACKER |
| Address | 45 VIEW AVE | 6788 297th N AVE |
|  | ALBANY New York | Clearwater Florida |
|  | United States 12209-2225 | United States 33761-1617 |
| Phone | 1 518 500045 | 1 518 369809 |
| Email | 46@gmail.com | 1112@abc.com |
| Primary Key | 14555 | 14555 |

After the masking is complete, the masking process generates output files that get stored in the directory structure 212 from where the enduser 208 can access them via computer 202. These files would then be used to populate business application that will be accessed by the development firm or other software development group that requires comparable data for their work but do not have authorization to view the actual values of the data.

Figure 7B:
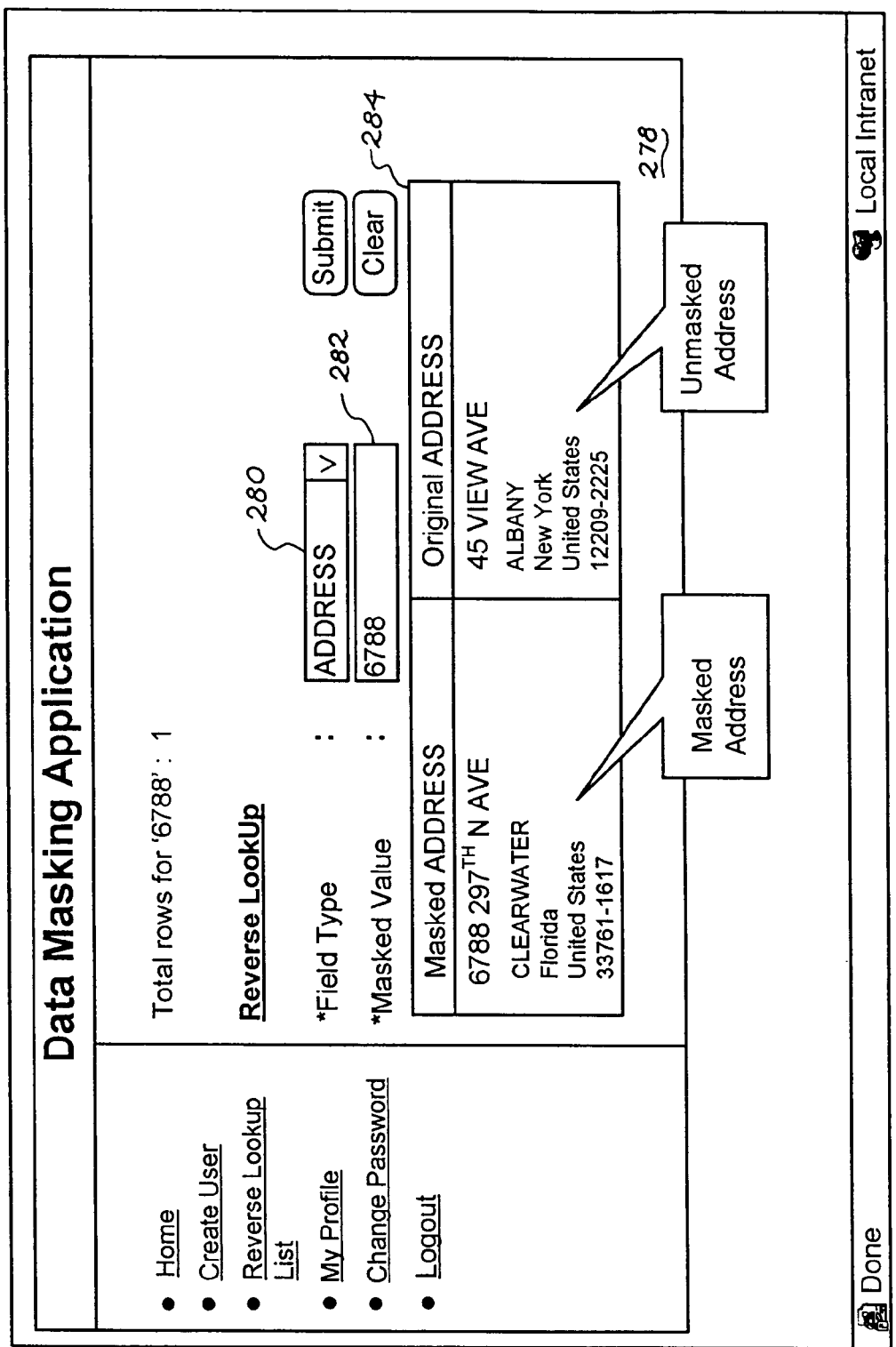

A user can perform a reverse lookup/masking determination of the original values by using the web based user interface 276 accessed via computer 202. After logging into the User Interface via personal computer 202, the user navigates to a reverse lookup screen 278 shown on display 204. The user selects a field type, such as first name, last name, etc., to be searched in the "Field Type" entry box and enters a corresponding masked value or a substring of it in the Masked Value box 282 as shown in FIG. 6A. When the masked value is entered and the button "Submit" is clicked, a table 284 showing the original value appears on display 204 as shown in FIG. 6B. The example in FIGS. 6A-B show the case where an original first name is determined. Other data, such as last names and addresses, can be unmasked in a similar manner as shown in FIGS. 7A-B.

For masking functions that utilize lookup tables, the reverse masking operation involves performing a search on the appropriate reference table 262 for the value. The reverse masking operation returns the unique identifier (row id) that identifies the row in the reference table corresponding to the masked value. Row id is a value that is generated and maintained internally by the database 218. Within each table of a relational database, it is necessary to assign a unique value to each row of said table in order to guarantee that no two rows will have identical values. This is important in a relational database in order to maintain referential integrity. Referential integrity is a database concept that ensures that relationships between tables remain consistent and that the database is capable of identifying each row in a table. The reverse masking operation then performs a search on the lookup table 260 for the row id value to see what unmasked value has been associated with the masked value. The reverse masking operation then returns the unmasked value corresponding to the row id value.

For numeric numbers that have been masked using a cipher that translates each digit in a number to a masked value based on its position, the reverse masking operation uses the position of the masked digit and its value to locate the original unmasked value for that position. By repeating this process for all the digits in the number, the reverse lookup function for numeric number is able to reconstruct the entire original unmasked number.

The foregoing description is provided to illustrate the invention, and is not to be construed as a limitation. Numerous additions, substitutions and other changes can be made to the invention without departing from its scope as set forth in the appended claims.

We claim:

1. A data masking system comprising:
   a file transferring device for uploading and downloading files;
   a directory operationally connected to said file transferring device and comprising an input data file that comprises a field of data to be masked;
   a masking application system that receives said input data file from said directory and masks said field of data in the form of an output data file, wherein said masking application system comprises a structure that masks any type of text based data regardless of platform, database type or vendor that generates said any type of text based data, wherein said directory further comprises a meta data file comprising information pertaining to a format of said input data file and a format of said output data file.

2. The data masking system of claim 1, wherein said meta data file comprises information that said input data file is to be masked.

3. The data masking system of claim 1, wherein said meta data file comprises information that said field of data is to be masked.

4. The data masking system of claim 1, further comprising:
   a data input polling mechanism that searches said directory for said meta data file and said input data file and creates a thread to process said meta data file, wherein a thread is a process in a multithreading environment whereby two or more parts of a program can run simultaneously;
   a data masking application parser that receives said meta data file processed by said thread and extracts said information from said meta file, wherein said data masking application parser operates on said meta data file and prepares a corresponding DOM Object from which said data masking application parser reads nodes and subnodes of said DOM Object and forms and saves a Meta Data Object that stores said information of said meta data file.

5. The data masking system of claim 4, further comprising a text file reader that receives said input data file and reads said input data file based on said information of said Meta Data Object, wherein said text file reader reads a predetermined number of rows from said input data file at one time and stores said read predetermined number of rows in a chunk object.

6. The data masking system of claim 5, further comprising a mask supervisor that receives said chunk object and determines if chunk data associated with said chunk object has a flag associated with it indicating whether said chunk data of said chunk object is to be masked, wherein said mask supervisor masks said chunk object only if said flag indicates said chunk data of said chunk object is to be masked.

7. The data masking system of claim 6, wherein said mask supervisor masks said chunk data by applying a masking function that performs a masking process to said chunk data of said chunk object that is specific to said chunk data of said chunk object, wherein said masking process overwrites said chunk data of said chunk object with masked data in said chunk object.

8. The data masking system of claim 7, wherein said chunk data of said chunk object are numeric in nature and said masking process performs a calculation to derive a new number that has the same length as said chunk data of said chunk object.

9. The data masking system of claim 8, wherein said masking function is a cipher that translates each digit in a number to a masked value based on a position of each digit.

10. The data masking system of claim 8, wherein said chunk data of said chunk object contains alpha numeric information and said masking function masks said chunk data of said chunk object using a lookup table and a reference table corresponding to said masking function using masked values in said reference table.

11. The data masking system of claim 1, wherein said masking application system uses a lookup table for masking said field of data and said user interface has access to a reference table that corresponds to said lookup table and wherein a user interface implements a reverse masking operation that identifies a row of said reference table that corresponds to a particular masked value in said field of data and uses said identified row to search said lookup table to identify an unmasked value that corresponds to said masked value.

12. The data masking system of claim 1, wherein said masking application system uses a cipher for translating each number in an unmasked value into a masked value based on its position and a user interface is able to perform an unmasking process that translates each masked value into its corresponding unmasked value prior to being subjected to said cipher.

13. A process for masking data, the process comprising:
providing a field of data to a masking application system;
replacing said field of data with identical masked data regardless of a type of application that supplies said field of data to said masking application system; and
forming a meta data file that comprises information pertaining to a format of a piece of data and a format of said masked data as output from said masking application system.

14. The process of claim 13, further comprising:
extracting said information from said meta data file;
preparing a DOM Object;
reading nodes and subnodes of said DOM Object;
based on said reading, forming and saving a Meta Data Object that stores said information of said meta data file;
reading said field of data based on said Meta Data Object; and
forming a chunk of data based on said reading.

15. The process of claim 14, wherein data associated with said chunk of data is replaced with identical masked data regardless of a type of application that supplies said field of data to said masking application system.

16. The process of claim 14, further comprising determining whether or not said field of data is to be masked and only masking said field of data if it is so determined.

17. The process of claim 14, wherein said meta data file comprises information that said field of data is to be masked.

18. A process for masking data, the process comprising:
providing a field of data to a masking application system;
replacing said field of data with masked data, wherein a case of said masked data is controlled;
forming a meta data file that comprises information pertaining to said case of said masked data; and
controlling said case of said masked data with said meta data file.

19. The process of claim 18, wherein said case of said masked data is controlled so as to be upper case.

20. The process of claim 18, wherein said case of said masked data is controlled so as to be lower case.

21. The process of claim 18, wherein said case of said masked data is controlled so as to be proper case.

22. A process for masking data, the process comprising:
providing a field of data to a masking application system;
replacing said field of data with masked data in a consistent manner so that each time said field of data is replaced with masked data, said masked data is always the same; and
forming a meta data file that comprises information pertaining to a format of a piece of data and a format of said masked data.

23. The process of claim 22, wherein said replacing is performed regardless of a type of application that supplies said field of data to said masking application system.

24. A process for masking data, the process comprising:
providing a field of data to a masking application system;
replacing said field of data with masked data, wherein masked data is always available for use during said replacing process;
providing a reference table comprising masked values for said field of data; and
providing a lookup table comprising a list of possible masked values for said field of data and existing relationships between unmasked data in said field of data and masked values from said reference table.

25. The process of claim 24, wherein said field of data comprises numeric data elements and said replacing comprises applying an equation to said field of data to generate said masked data.

26. The process of claim 24, wherein said field of data comprises numeric data elements and said replacing comprises applying a cipher to said field of data to generate said masked data.

27. The process of claim 24 further comprising determining for a particular data element of said field of data from said lookup table whether or not an association has previously been established between said data element and a masked value.

28. The process of claim 27, wherein should said determining reveal that there is an association that has previously been established between said data element and a masked value, then replacing shall replace said data element with said masked value present in said reference table.

29. The process of claim 27, wherein should said determining reveal that there is no association that has previously been established between said data element and a masked value, then replacing shall create an association between said data element with an unassociated masked value present in said reference table and replace said data element with said unassociated masked value.

30. The process of claim 24, wherein said replacing is performed regardless of a type of application that supplies said field of data to said masking application system.

31. A process for masking data, the process comprising:
providing a field of data to a masking application system, wherein said field of data comprises n elements and an element is a member of a set of parameters that has m possible values;
replacing said field of data with masked data in accordance with a cipher, wherein said cipher comprises a matrix of n by m random masked values and said replacing comprises replacing an ith element of said field of data having a value of j with a masked value in said matrix that is located at the ith row and the jth column.

* * * * *

UNITED STATES PATENT AND TRADEMARK OFFICE
CERTIFICATE OF CORRECTION

| | | |
|---|---|---|
| PATENT NO. | : 7,836,508 B2 | Page 1 of 1 |
| APPLICATION NO. | : 11/273449 | |
| DATED | : November 16, 2010 | |
| INVENTOR(S) | : Gumpel et al. | |

It is certified that error appears in the above-identified patent and that said Letters Patent is hereby corrected as shown below:

<u>On the Title Page</u>

Right column, line 15, after "were publicly available as of" replace "Jan. 20" with --Jan. 30--.

Signed and Sealed this
Thirty-first Day of May, 2011

David J. Kappos
*Director of the United States Patent and Trademark Office*